United States Patent
Ward

(10) Patent No.: US 11,687,710 B2
(45) Date of Patent: Jun. 27, 2023

(54) SYSTEMS AND METHODS FOR CLOUD-BASED PRODUCTIVITY TOOLS

(71) Applicant: Jon Ward, Tempe, AZ (US)

(72) Inventor: Jon Ward, Tempe, AZ (US)

(73) Assignee: Braincat, Inc., Tempe, AZ (US)

( * ) Notice: Subject to any disclaimer, the term of this patent is extended or adjusted under 35 U.S.C. 154(b) by 88 days.

(21) Appl. No.: 17/222,956

(22) Filed: Apr. 5, 2021

(65) Prior Publication Data
US 2021/0312123 A1    Oct. 7, 2021

Related U.S. Application Data

(60) Provisional application No. 63/005,089, filed on Apr. 3, 2020.

(51) Int. Cl.
| | |
|---|---|
| *G06F 40/205* | (2020.01) |
| *G06F 40/166* | (2020.01) |
| *G06F 40/253* | (2020.01) |
| *G06F 40/30* | (2020.01) |
| *G06F 3/04842* | (2022.01) |

(52) U.S. Cl.
CPC .......... *G06F 40/205* (2020.01); *G06F 40/166* (2020.01); *G06F 40/253* (2020.01); *G06F 40/30* (2020.01); *G06F 3/04842* (2013.01)

(58) Field of Classification Search
CPC ....... H04L 67/535; H04L 51/42; H04L 67/02; H04L 51/234; G06F 3/04842; G06F 3/0485; G06F 3/0488; G06F 40/14; G06F 40/166
See application file for complete search history.

(56) References Cited

U.S. PATENT DOCUMENTS

| | | | | |
|---|---|---|---|---|
| 5,819,260 A | * | 10/1998 | Lu ........................ | G06F 16/30 |
| | | | | 707/999.005 |
| 6,886,010 B2 | * | 4/2005 | Kostoff ................ | G06F 16/35 |
| 7,822,598 B2 | * | 10/2010 | Carus ................... | G06F 40/30 |
| | | | | 704/9 |

(Continued)

FOREIGN PATENT DOCUMENTS

| | | | | |
|---|---|---|---|---|
| AU | 2009298151 A1 | * | 12/2010 | ......... G06N 99/005 |
| CN | 115035490 A | * | 3/2021 | |
| CN | 113377850 A | * | 9/2021 | |

*Primary Examiner* — Hassan Mrabi
(74) *Attorney, Agent, or Firm* — Jennings, Strouss & Salmon, P.L.C.

(57) ABSTRACT

A computer-implemented, cloud-based productivity tool incorporates a user interface configured to: (a) prompt the user to input a set of unstructured text strings; (b) allow the user to categorize the set of unstructured text strings in accordance with a set of categories provided by the user; (c) sequence the categorized text strings; (d) summarize the categorized text strings; and (e) produce an output based on the foregoing. In this way—by using a form of "reverse mind-mapping"—a user can quickly enter his or her thoughts in a free-form way and then subsequently organize that information in accordance with emergent categories that become apparent to the user through the process provided by the tool. A social aspect is provided to allow shared thinking between subscribers through text communication. In addition, a journaling module is provided for extracting insights from writing that accumulates over time.

10 Claims, 18 Drawing Sheets

(56) References Cited

U.S. PATENT DOCUMENTS

| | | | |
|---|---|---|---|
| 8,887,044 B1* | 11/2014 | Goodspeed | G06F 3/04842 |
| | | | 715/776 |
| 9,529,922 B1* | 12/2016 | Wahi | G06F 16/27 |
| 10,733,256 B2* | 8/2020 | Fickenscher | G06F 16/248 |
| 10,783,196 B2* | 9/2020 | Grehant | G06F 16/9535 |
| 10,812,589 B2* | 10/2020 | Thomas | H04L 67/568 |
| 10,963,347 B1* | 3/2021 | Chen | G06F 12/0802 |
| 11,089,105 B1* | 8/2021 | Karumbunathan | G06F 3/065 |
| 11,093,518 B1* | 8/2021 | Lu | G06F 11/3476 |
| 11,106,442 B1* | 8/2021 | Hsiao | H04L 41/22 |
| 2003/0126136 A1* | 7/2003 | Omoigui | H04L 67/02 |
| 2004/0163035 A1* | 8/2004 | Ariel | G06V 30/248 |
| | | | 715/230 |
| 2005/0192792 A1* | 9/2005 | Carus | G06F 40/30 |
| | | | 704/2 |
| 2006/0029296 A1* | 2/2006 | King | G06F 40/169 |
| | | | 382/313 |
| 2014/0188830 A1* | 7/2014 | deVille | G06F 16/355 |
| | | | 707/738 |
| 2016/0197993 A1* | 7/2016 | Perkowski | H04L 67/02 |
| | | | 709/203 |
| 2018/0024981 A1* | 1/2018 | Xia | G06F 40/18 |
| | | | 715/215 |
| 2018/0089328 A1* | 3/2018 | Bath | G06F 16/22 |
| 2019/0082210 A1* | 3/2019 | Alvarez | H04N 21/23 |
| 2019/0095478 A1* | 3/2019 | Tankersley | G06F 16/288 |
| 2020/0111023 A1* | 4/2020 | Pondicherry Murugappan | G06Q 10/0631 |
| 2020/0250562 A1* | 8/2020 | Bly | G06N 5/022 |
| 2020/0327432 A1* | 10/2020 | Doebelin | G06N 5/02 |
| 2021/0342337 A1* | 11/2021 | Lu | G06F 11/3006 |
| 2022/0114186 A1* | 4/2022 | Frazier | G06F 16/242 |

* cited by examiner

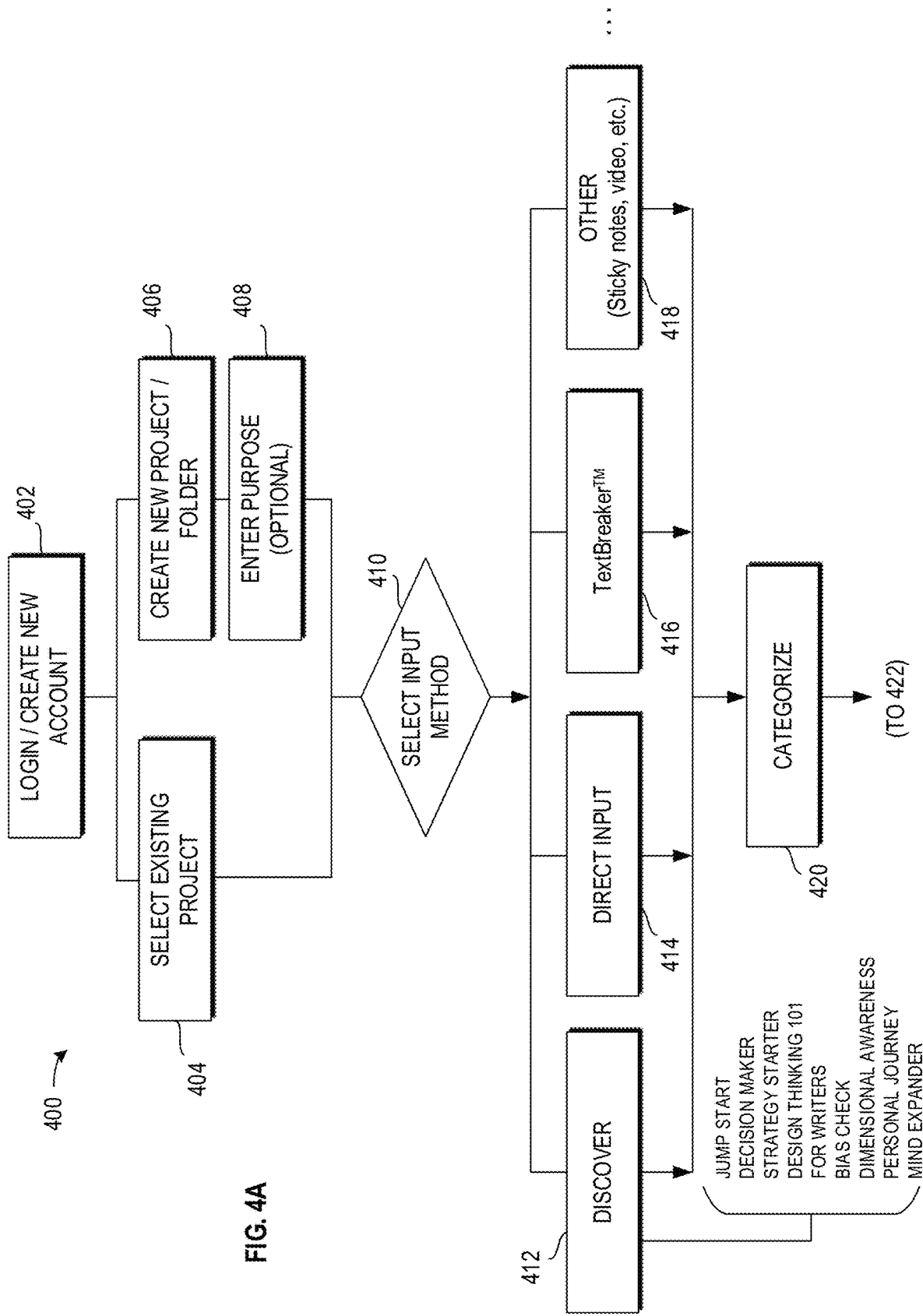

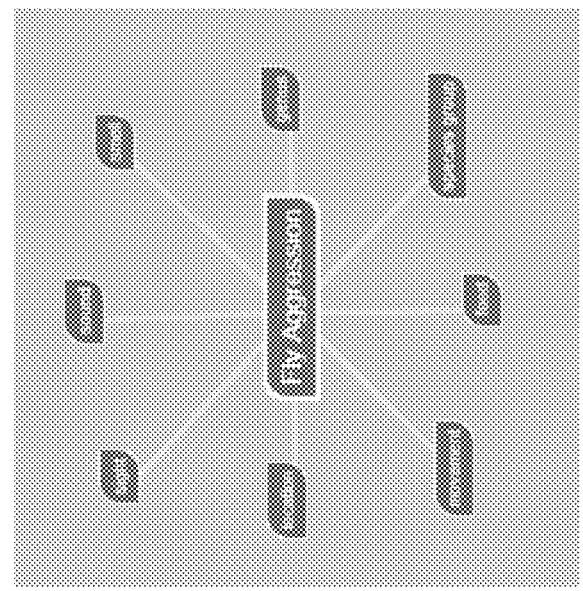
FIG. 12
FIG. 11
FIG. 10

SYSTEMS AND METHODS FOR CLOUD-BASED PRODUCTIVITY TOOLS

CROSS-REFERENCE TO RELATED APPLICATIONS

This application claims priority to U.S. Provisional Patent Application No. 63/005,089, filed Apr. 3, 2020, the entire contents of which are incorporated by reference.

TECHNICAL FIELD

The present invention relates, generally, to computer based productivity tools and, more particularly, to cloud-based tools for categorizing, sequencing, and understanding large amounts of unstructured information

BACKGROUND

In recent years, the volume of information that an individual is subjected to has increased dramatically. Indeed, some estimates suggest that the total volume of knowledge in the world (online and elsewhere) is doubling every year. Moreover, the signal-to-noise ratio of this information is low, which takes a toll on individuals attempting—with little success—to organize their own thoughts and make sense of a torrent of random, unsorted, and unstructured ambient data.

While various mind-mapping and note-taking applications have been developed over the years to address these concerns, such tools are generally unsatisfactory in a number of respects. For example, traditional mind-mapping systems require a user to organize or otherwise categorize information at the point it is entered into a system. This presents a cognitive load that inhibits the entry of information in a free-flowing, stream-of-conscious manner. And while note-taking software or webpage aggregation systems often allow a user to 'tag' content with categories, such tags are generally only used to search and find information, rather than organizing it in a useful manner.

Furthermore, prior art systems do not generally appreciate the various ways that a human being can generate meaning from data—e.g., through a question-answer process rather than direct input. In addition, prior art systems do not provide a means for a user to enter a large block of data and then quickly parse and winnow that data down to a meaningful set of inputs and categories.

Systems and methods are therefore needed that overcome these and other limitations of the prior art.

SUMMARY OF THE INVENTION

Various embodiments of the present invention relate to systems and methods for enabling a user or team of users to think clearly about vast amounts of unstructured and/or unsorted information. In accordance with one embodiment, a computer-implemented, cloud-based productivity tool incorporates a user interface configured to: (a) prompt the user to input a set of unstructured text strings; (b) allow the user to categorize the set of unstructured text strings in accordance with a set of categories provided by the user; (c) sequence the categorized text strings; (d) summarize the categorized text strings; and (e) produce an output based on the foregoing. In this way—by using a form of "reverse mind-mapping" (described in further detail below)—a user can quickly enter his or her thoughts in a free-form way and then subsequently organize that information in accordance with emergent categories that become apparent to the user through the process provided by the tool.

In accordance with one embodiment, the user interface allows a user to enter a large block of text (e.g., via cut-and-paste from any text source, or by importing a Word document, or the like), which is then parsed into individual text strings for subsequent categorization by the user (i.e., "TextBreaker").

In accordance with another embodiment, the user interface includes a "discover" process that prompts the user for the text string input through a question/answer format. The users can respond to questions provided under various topics, such as writing, decision-making, etc., or users can create their own customized question set.

In accordance with one embodiment, the system incorporates a journaling component that allows the user to enter short paragraphs (as part of a larger journal), then select a subset of these entries as "journal highlights", which are then processed by the TextBreaker module to create individual text strings for subsequent categorization.

In accordance with one embodiment, the system has a social aspect that allows users to incorporate text messages and other content generated via social networking applications. This allows subscribers to engage others in a shared thinking project through the use of text communication.

BRIEF DESCRIPTION OF THE DRAWING FIGURES

The present invention will hereinafter be described in conjunction with the appended drawing figures, wherein like numerals denote like elements, and:

FIGS. 4A and 4B are flowcharts illustrating a method in accordance with various embodiments of the present invention;

FIGS. 5-12 illustrate exemplary user interfaces for performing a method in accordance with various embodiments;

DETAILED DESCRIPTION OF PREFERRED EXEMPLARY EMBODIMENTS

The present subject matter relates to systems and methods for enabling a user or team of users to think clearly about vast amounts of unstructured and/or unsorted information. In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to cloud-based computing systems, databases, mind-mapping software, note-taking software, front-end website design, and other such conventional components and processes may not be described in detail herein.

Figure 1:
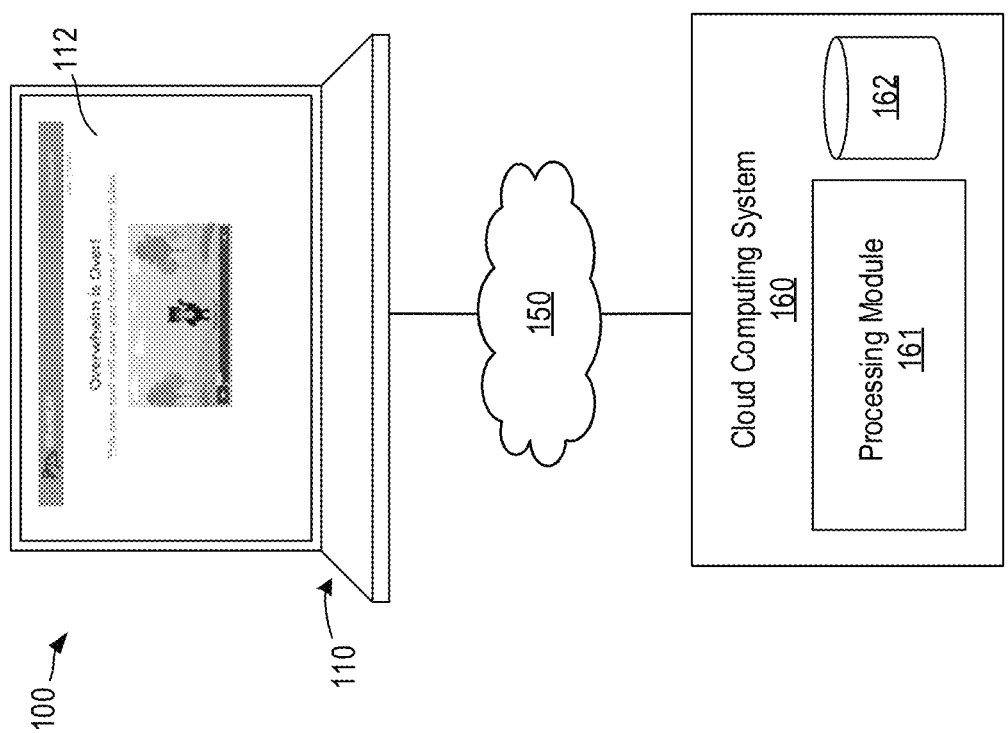
FIG. 1 is a block diagram illustrating a cloud-based productivity system (or "reverse mind-mapping tool") in accordance with various embodiments.

Referring first to FIG. 1, a productivity system (or simply "system") 100 in accordance with various embodiments may be deployed in the context of a networked computing system that generally includes, as illustrated, a computing device 110 having an associated display 112 and a network interface configured to allow computing device 110 to communicate with a cloud computing system 160 over a network (e.g., the Internet) 150. While computing device 110 is illustrated in FIG. 1 as a conventional laptop computer, the present invention is not so limited, and may be used in conjunction with any form of computing device now known or later developed, including, for example, desktop computers, smart phones, tablet computers, and the like. Cloud computing system 160 includes a processing module configured to provide the "reverse mind-mapping" functionality described herein, along with a suitable data store or other database system 162 for securely storing user data.

Figure 2:
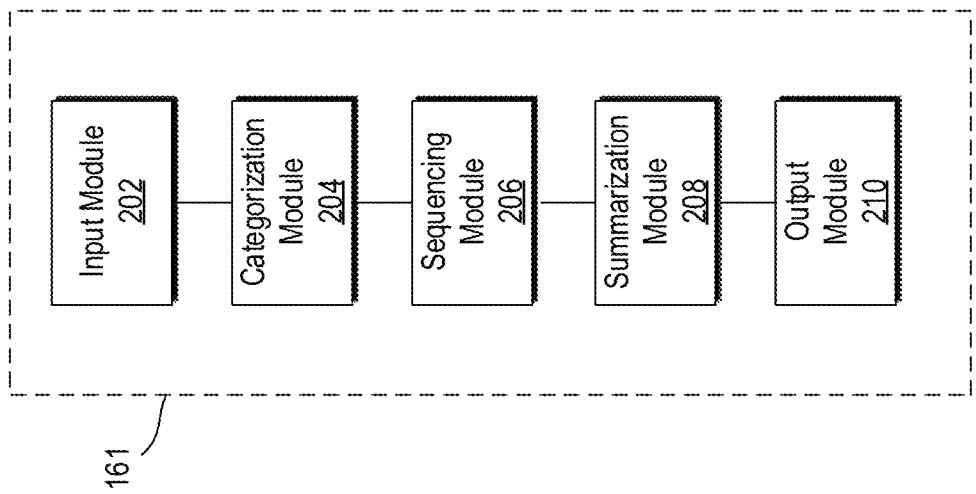
FIG. 2 is a conceptual block diagram illustrating, at a high level, the various functional modules of the processing module illustrated in FIG. 1.

Referring now to FIG. 2 in conjunction with FIG. 1, processing module 161 generally includes an input module 202 (configured to receive input and otherwise interact with a user), a categorization module 204 (configured to allow a user to specify categories for the provided user data), a sequencing module 206 (configured to allow a user to specify an order or priority for the user data and/or categories), a summarization module 208 (configured to provide a summary of the provided user data), and an output module 210 (configured to provide a visualization of the data provided by the user).

As a preliminary matter, it is helpful to describe one of the ways in which the present invention differs from conventional, prior art mind-mapping system. Referring to FIG. 3A, for example, prior art systems generally require the user to organize the content at the point that he or she actually enters the content. The tree structure 300 of FIG. 3A illustrates this in the form of categories (e.g., 301 and 302), each having a hierarchical set of nodes or leaves (e.g., 303) that correspond to particular ideas/concepts/snippets entered by the user. It will be appreciated that there is a substantial burden associated with this paradigm, in which the user must know, a priori, how the information must be organized.

Figure 3B:
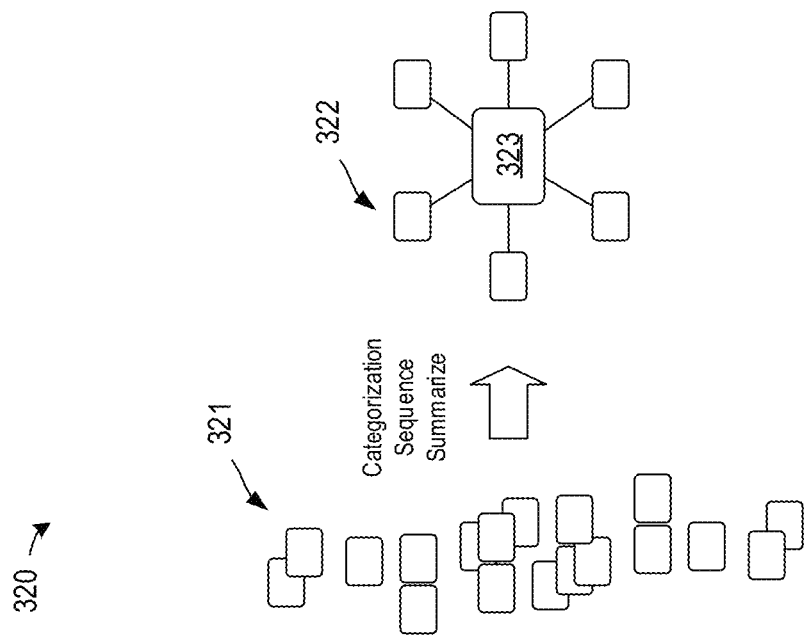
FIGS. 3A and 3B illustrate various differences between the present system and prior art mind mapping tools.
Figure 3A:
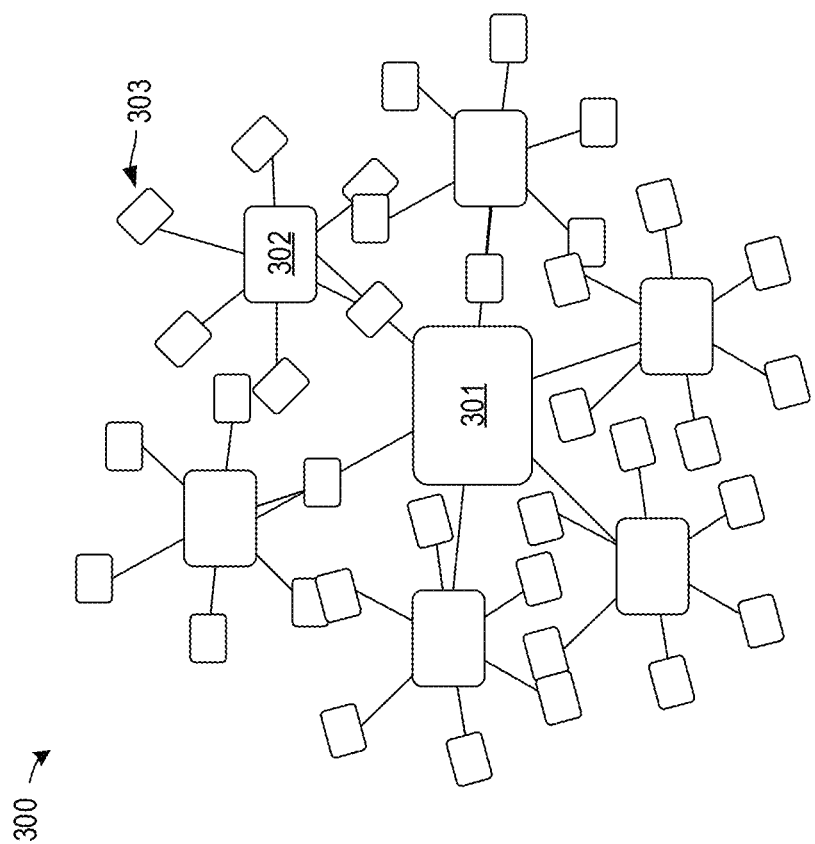

In contrast, referring to FIG. 3B, the present system 320 contemplates that the user to freely enter concepts/ideas/snippets 321 in a more or less random order, after which—through categorizing and sequencing—the natural organization of the information is revealed (e.g., category 323 and concept 322).

Stated another way, prior art systems tend to progress from the simple to complex (as in FIG. 3A), while the present invention tends to progress from complex to simple (as in FIG. 3B). Conventional systems require the user to ask himself, "what leads to what," while the present system employs a form of pattern-seeking, i.e., "what belongs with what." In this way, the process of entering data is de-coupled from the act of assigning categories. Conventional systems leverage the cognitive function of association ("what leads to what?") but under-utilize the more fundamental cognitive function of pattern-seeking ("what belongs with what?"). The present system is based on the pattern-seeking function of the human brain.

Having thus given a general overview of a cloud-based organization tool in accordance with various, a method 400 of using such a system will now be described in conjunction with the flowcharts of 4A and 4B.

Figure 4B:
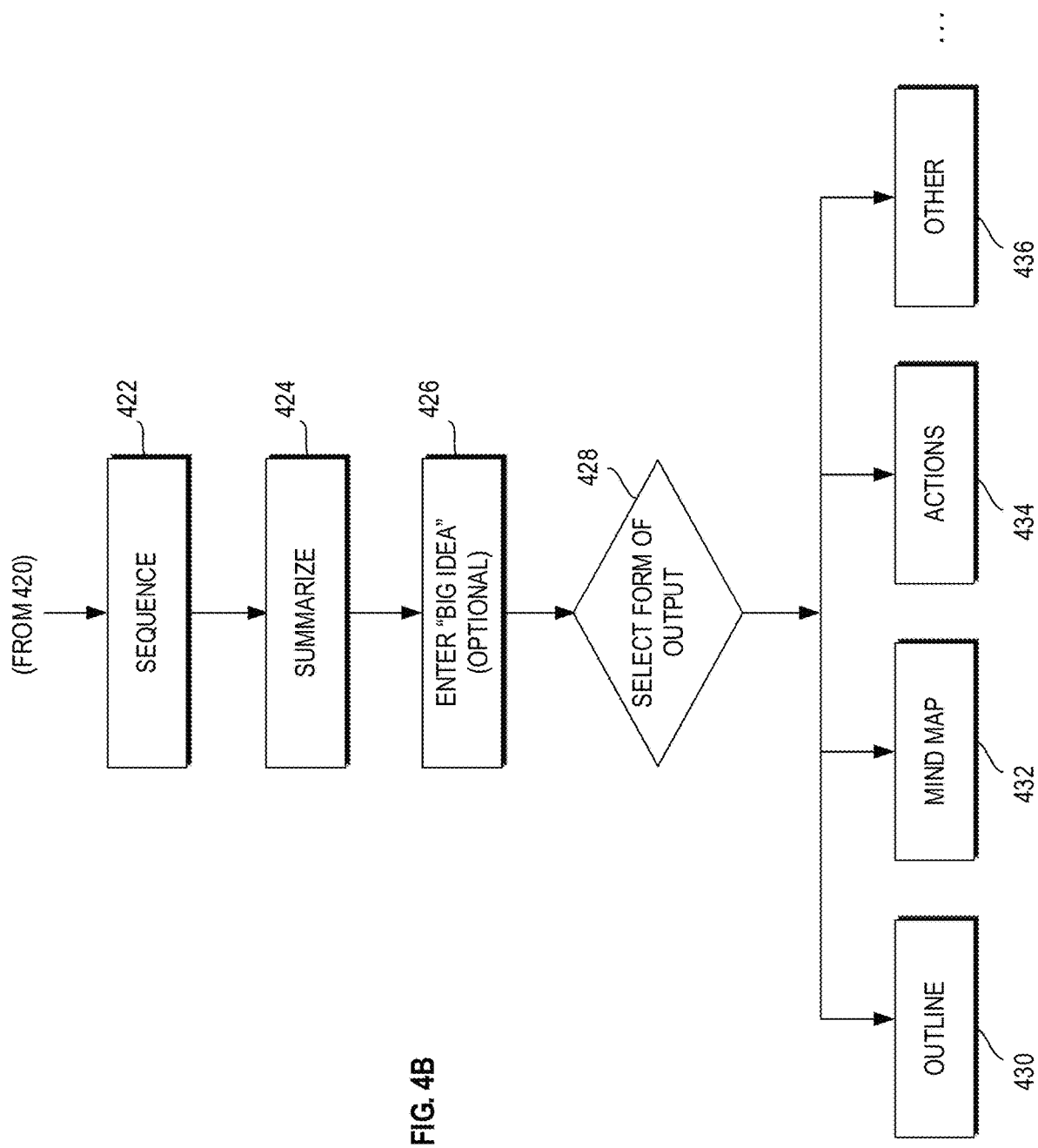

Referring first to FIG. 4A, the process begins with the user either logging in (to a pre-existing account) or creating a new account (step 402). At this point, the user may select an existing project (step 404), or create a new project (step 406). In the latter case, the user may optionally enter a purpose (e.g., a text string description) for the project (step 408).

At step 410, the user selects an input method. In accordance with various embodiments, these methods are labeled "Discover" (412), "Direct Input" (414), TextBreaker™ (416), and "Other" (418). The direct input option 414 corresponds to the default method in which the user enters short phrases, words, into an input box that is then saved to the corresponding project folder. This input may be provided directly via a keyboard or other user interface device, such as audio dictation, but also may be provided by importing such text from a preexisting file (e.g., a text or CSV file). The user may also copy-and-paste such text into a dedicated input box.

The "Discover" option 412 corresponds to an input method in which the user is presented with a sequence of questions or prompts designed to elicit answers that are then entered as content into the associated project folder. Thus, the system actually "discovers" the structure of the input through a form of Socratic method. The nature and flow of these questions may vary. In one embodiment, as illustrated in FIG. 4A, these discovery subcategories include (without limitation): Jump Start, Decision Maker, Strategy Starter, Design Thinking 101, For Writers, Bias Check, Dimensional Awareness, Personal Journey, and Mind Expander.

In general, Jump Start provides open-ended questions for the user who do not know where or how to begin a thinking process. Decision Maker provides questions to help guide the process of decision making by, for example, listing options, identifying pros and cons, and naming criteria. Strategy Starter guides the process of strategic thinking by posing questions about outcomes, context, resources, trade-offs, and SWOT analysis (i.e., strengths, weaknesses, opportunities and threats). Design Thinking 101 poses questions derived from the generally accepted conventions of design thinking using the steps of Understand, Define, Ideate, Prototype, and Test. The Writers option presents questions to assist the planning and initiation of a writing project, addressing such issues as topic, audience, outcomes, organization, tone and possible models. Bias Check helps users identify their own cognitive biases by asking questions related to some of the most commonly occurring biases that have been identified by cognitive science. Dimensional Awareness poses questions that prompt users to explore their topic in relation to multiple dimensions, such as emotional, financial, historical, ecological, ethical, technological and spiritual dimensions. Personal Journey invites the user to examine his or her own life by presenting questions about thoughts, feelings, values, resources, goals, and challenges. Mind Expander is designed to stretch users' thinking by presenting questions that provoke attention to perspectives and issues that may have been ignored. In some embodiments, users may create their own question sets.

The TextBreaker option 416 allows a user to enter a large block of text into a user interface element, and that text is then broken up into individual phrases and words, which are then stored as content in an automated fashion. The parsing of the text block may be performed using, for example, punctuation cues, grammatical and semantic features (e.g., conjunctions, relative pronouns, and the like). This option may incorporate machine learning techniques, natural language processing (NLP) and other functionality. The user may also choose to have text broken into whole sentences, or (for use with lists) by line-breaks only.

The Other category 418 corresponds to any other way of entering content now known or later developed. Such methods might include, for example, the use of virtual sticky notes as well as optical character recognition applied to images bearing text information. In some embodiments, the user may enter data graphically using a mind map structure, as described in further detail below. Notes, PDFs, images, multimedia files and any other file may be attached to any particular entry for further retrieval during the output step.

After the user has provided the content (via one or more of steps 412, 414, 416, or 418), the system then prompts the user to categorize the content (step 420). In one embodiment, the entered content is presented to a user in the form of a list, and the user creates or selects a category for that element. Once a category has been created, it appears as a button or other user interface element that, when actuated by the user, enters the content into the correct field. This obviates the need for the user to re-type existing categories. During the categorization process 420, the user may delete uncategorized content or mark the item for an "Action", which will then later appear in an action output under the appropriate category heading.

In some embodiments, the user may be able to provide sub-categories and assign them to the entered content. The user may also group categories under a few higher-order headings, select key entries, or create categories in a "sticky notes" function and move notes under their respective categories.

The user may enter pre-determined categories or use preset templates of categories for specific project types (e.g., "Social Media Posts").

After the categorization step of 420, the user is then prompted to sequence the content (step 422). In general, this allows the user to change the sequence of the categories by dragging them up or down on the page or through some other user interaction. User may see and edit the content of the categories and/or edit or delete the categories themselves. User may also re-categorize the contents of any individual category or, indeed, all contents of a given project. The user may also re-sequence the content of each category.

After the content has been sequenced, the information is then summarized (step 424), and the user is prompted to optionally enter a "big idea" (step 426) that summaries all of the content using a short phrase or word. The big idea, if entered, will then appear at the top of an outline and/or in the center of a generated mind map, as described in further detail below.

Finally, the user is prompted to select a form of output (step 428). This output might take a variety of forms, for example, an editable outline (430), a mind map (432), actions (434), or some other form of output (436). In the case of an outline 430, the purpose (if any), big idea (if any), and the content is listed under respective category headings in the sequence specified in the sequencing step (422). In the case of a mind map (432), the big idea is illustrated at the center of a graphic encircled by the categories and associated content. Such a mind map is preferably interactive—i.e., the user may click on a category to reveal its contents. Additions, deletions, and changes in the outline or mind map are captured in the project database and reflected in any other chosen mode of output.

With respect to the actions option 434, the output may be provided to a Gantt chart or other visualization relating to planning or process management. In general, the actions option 434 enables users to select items for action and assign due dates, responsible parties, indicate progress in completion, and mark as complete.

Other forms of output 436 might include PowerPoint slides, PDF documents, MS Word documents, OPML files, Excel files, Evernote, Google Docs (or other cloud-hosted documents) or the like. In some embodiments, the form and content of the resulting output can be directly edited by the user after the fact.

Other special forms of output might include key entries only (i.e., an outline that displays only one key entry under each category), a "sticky notes" output (wherein users can view categorized entries as columns of sticky notes under their categories and export them for printing), "slide show" (in which users can generate a simple, editable, mobile-friendly slide show based on the categories and entries as well as external media files), "flash cards" (e.g., for educational purposes), "sharing" (in which users may share a non-editable outline or non-editable mind map with non-users of the system simply by sending a link). Users might also export uncategorized entries, questions and answers from the "Discover" process, and/or any notes or files appended to the entries.

Having thus provided a general overview of various systems and methods in accordance with the present invention, a non-limiting example of its use will now be provided.

Figure 5:
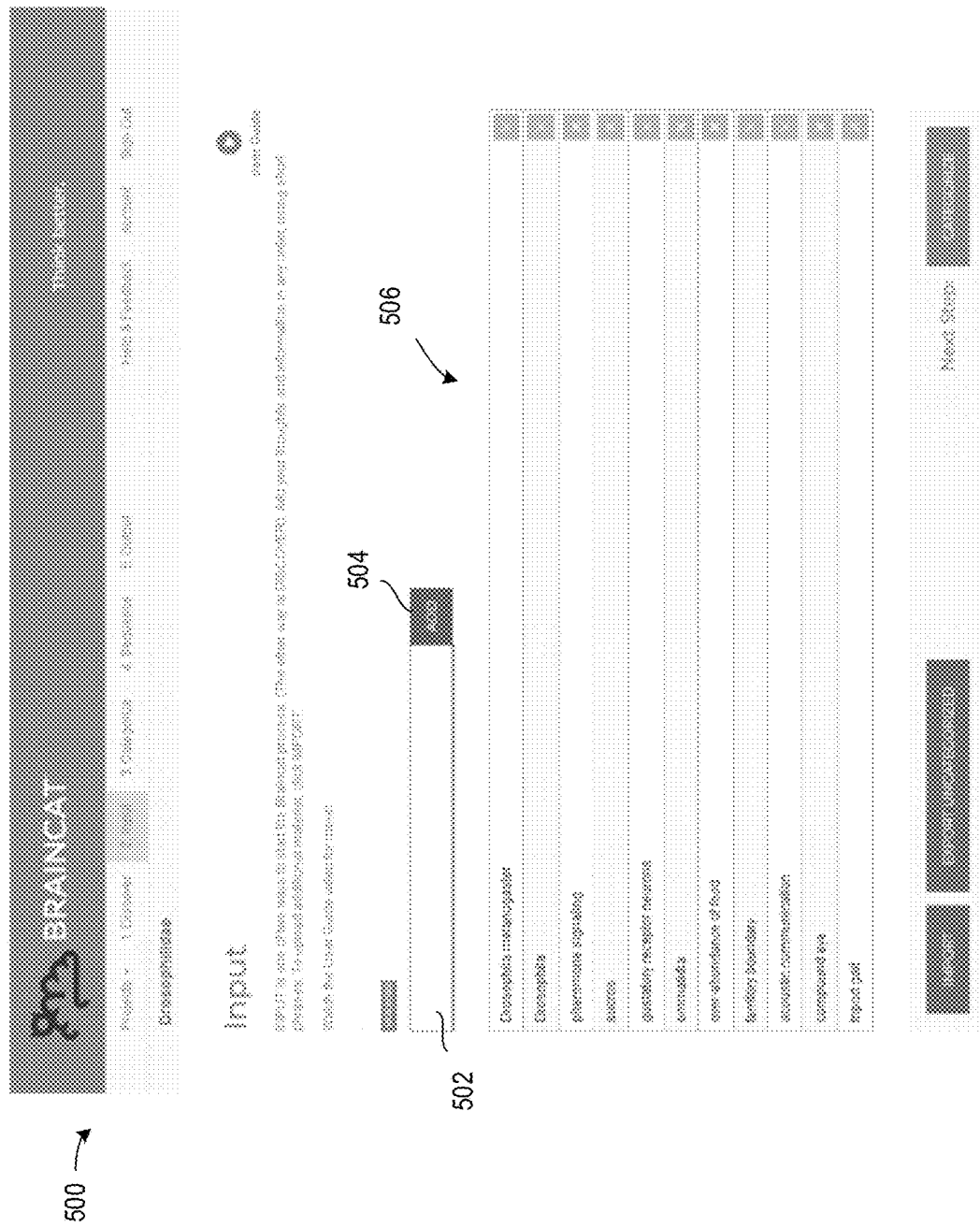

Referring first to FIG. 5, a user is presented with a user interface 500 (e.g., an HTML5 user interface comprising HTML, CSS, and JavaScript components) that allows the user to enter text in a text field 502 and add it to a list 506 via an "Add" button 504. In this example, the project is labeled "Drosophilidae," and the list 506 illustrates text snippets previously provided by the user. In the lower left, the user is presented with the option to import data and/or export uncategorized data. In the lower right, the user is prompted to move to the next step: "Categorize".

Figure 6:

Referring to FIG. 6, the user is then presented with a user interface 600 that allows to take the previously entered list 506 and assign a category, illustrated in the adjacent set of categories 602. The categories, as they are entered/selected by the user, appear as buttons 604 to the right of the category list 602. Referring to the bottom of the user interface 600, the user is prompted to add to the input, delete uncategorized input, save all, or proceed to the next step: "Sequence".

Figure 7:
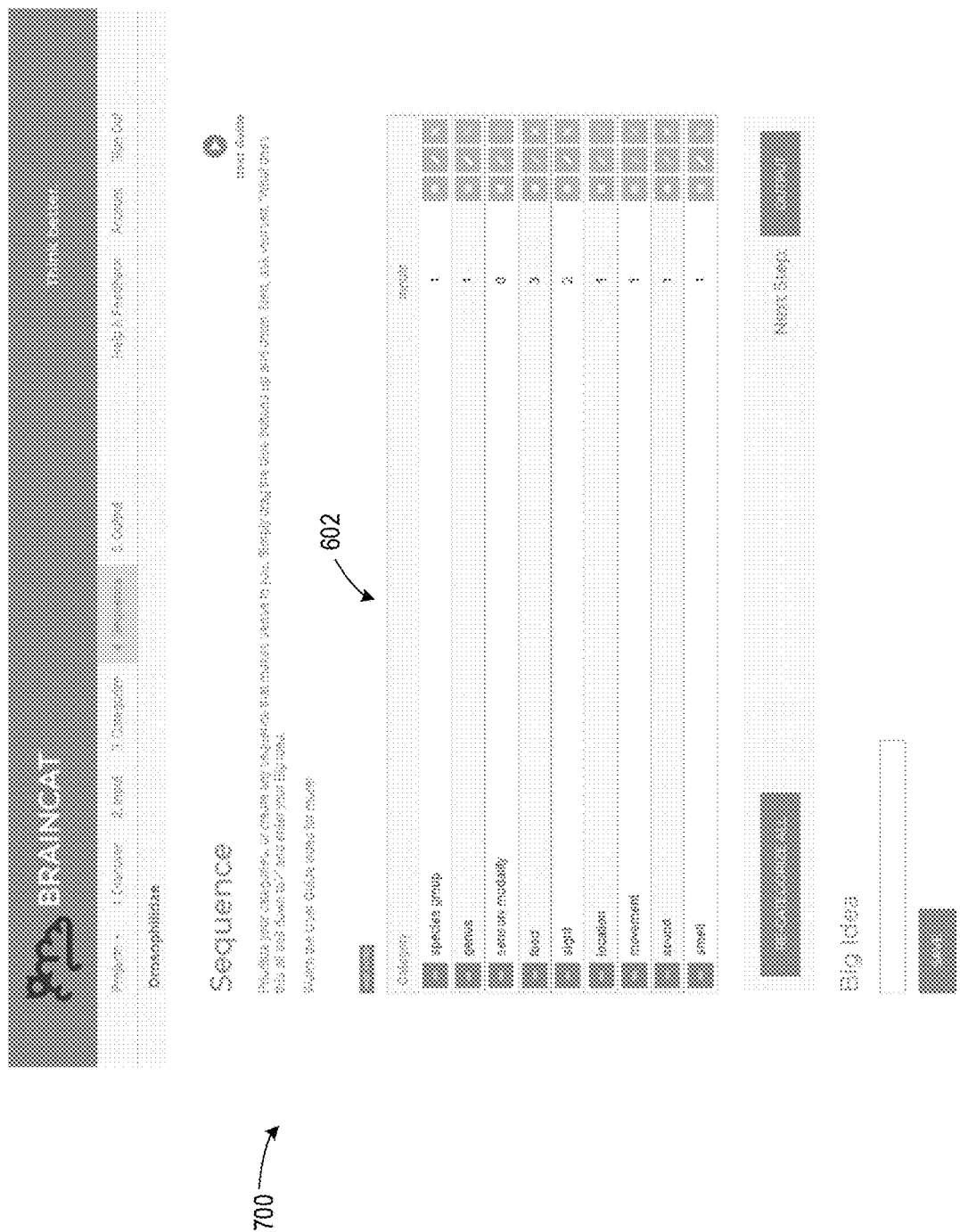
Figure 8:
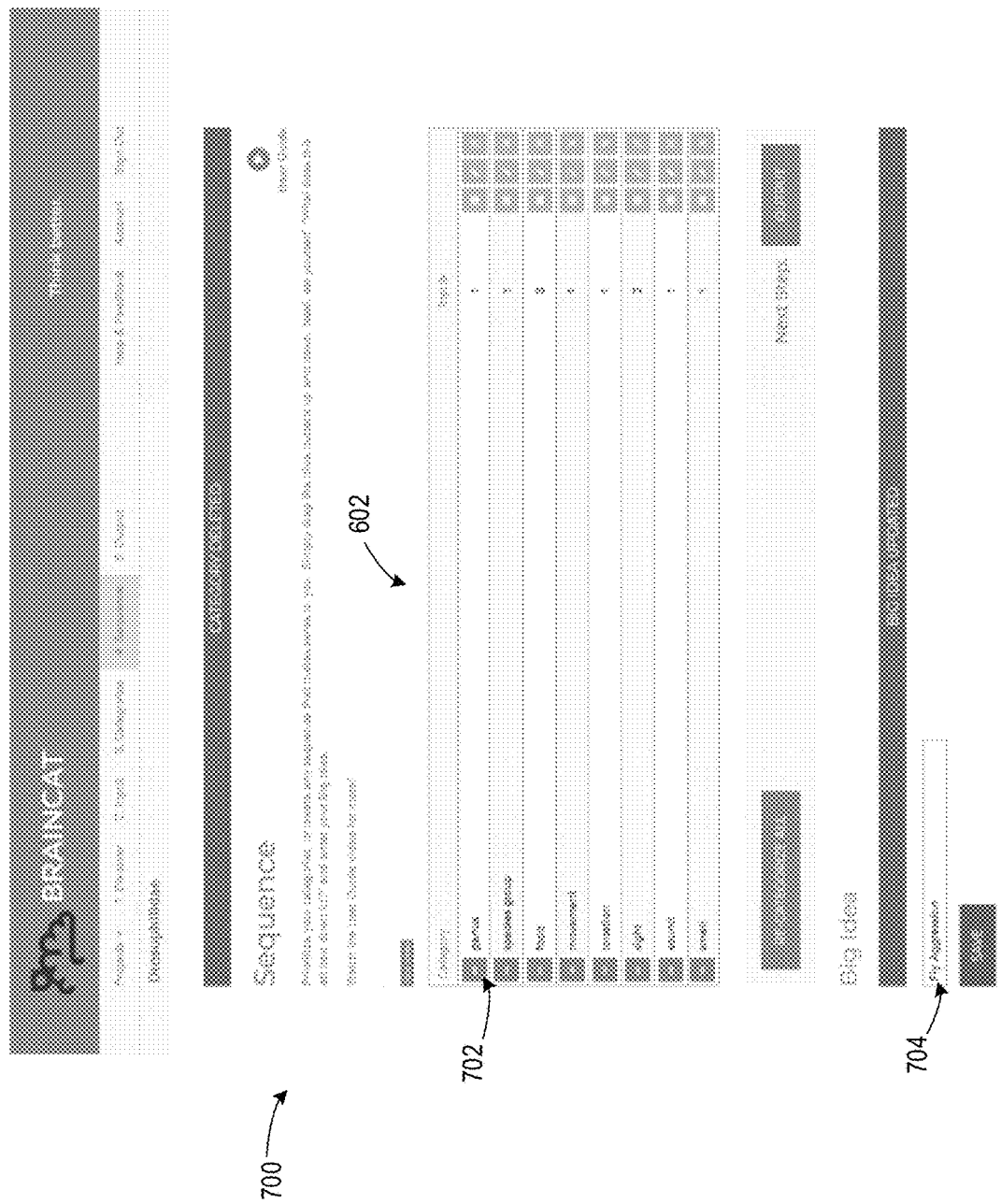

Referring to FIG. 7, user interface 700 includes a list 602 of the categories previously selected, along with a quantification of the number of inputs for each category and a set of user interface tools that allow the user to delete, edit, and/or move a particular category up and down within the list to change its priority. In this case, the category "species group" at the top of the list, and the category "smell" has is at the bottom of the list. The user is presented with the option to re-categorize all input, provide (optionally) a big idea, and/or move to the next step: "Output". Referring to FIG. 8, the user may further move around the categories (e.g., moving "genus" 702 to the top of the list) and/or enter a big idea 704 (in this case "Fly Aggression") and then save it via a "Save" button as shown.

Figure 9:
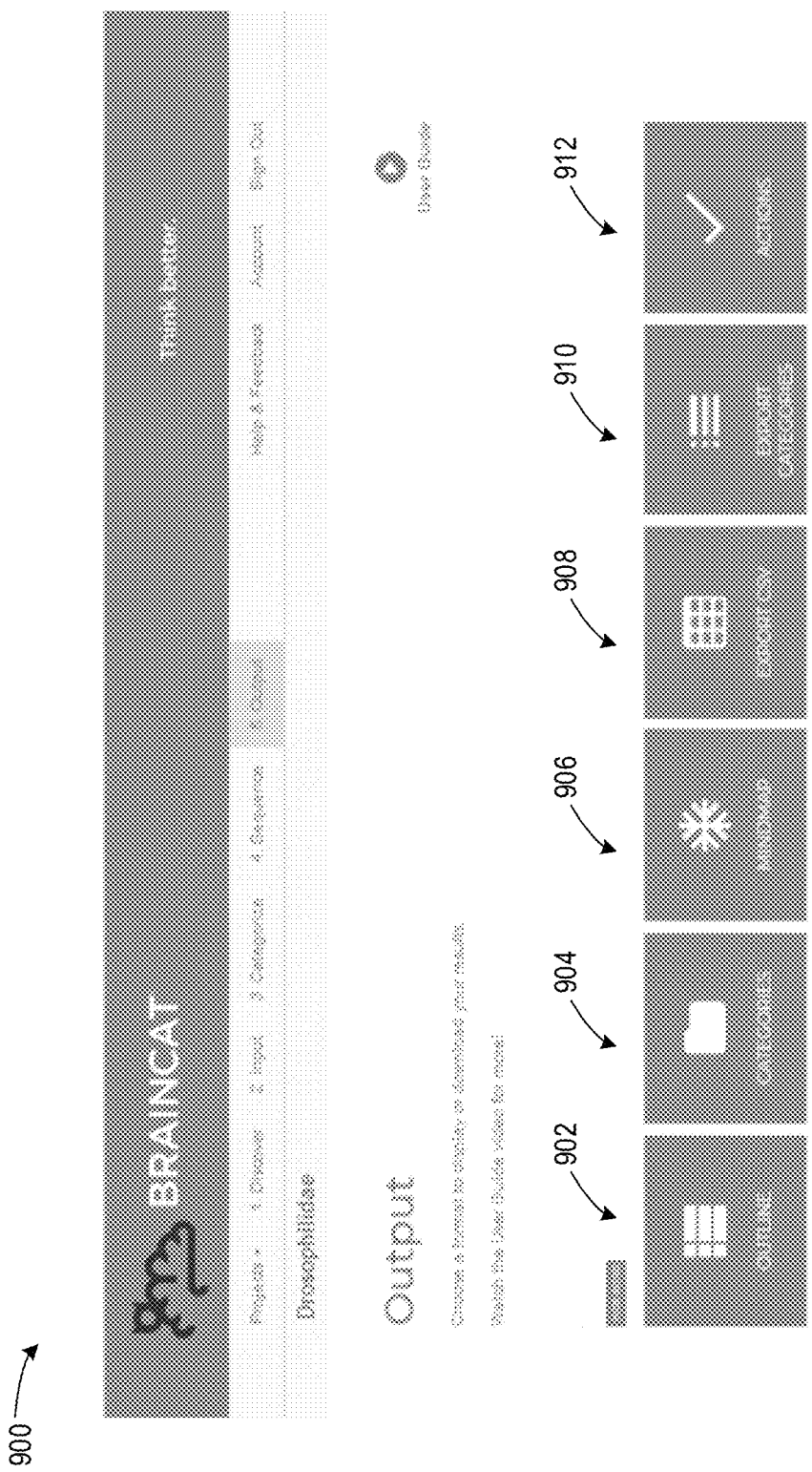

Next, as shown in FIG. 9, the user is presented with a user interface 900 that allows the user to select a particular form of output, i.e., outline (902), categories (904), mind map (906), export csv (908), export categories (910), and actions (912). FIGS. 10-12 show selected examples of such output, including an editable outline 1000 (FIG. 10), a category list 1100 (FIG. 11), and a mind map 1200 (FIG. 12).

Figure 13:
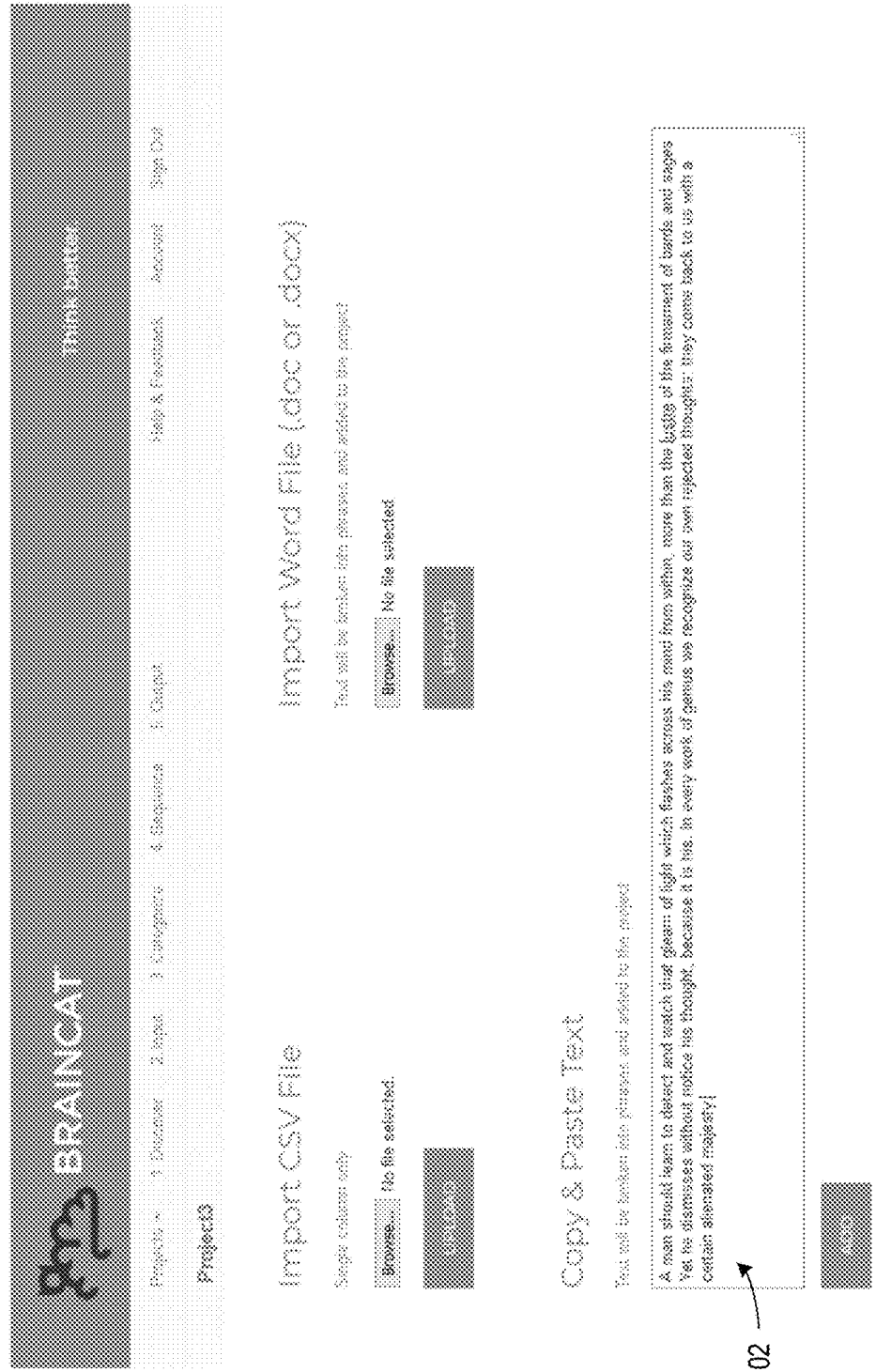
FIGS. 13-15 illustrate exemplary user interfaces for implementing "TextBreaker" functionality in accordance with various embodiments.
Figure 14:
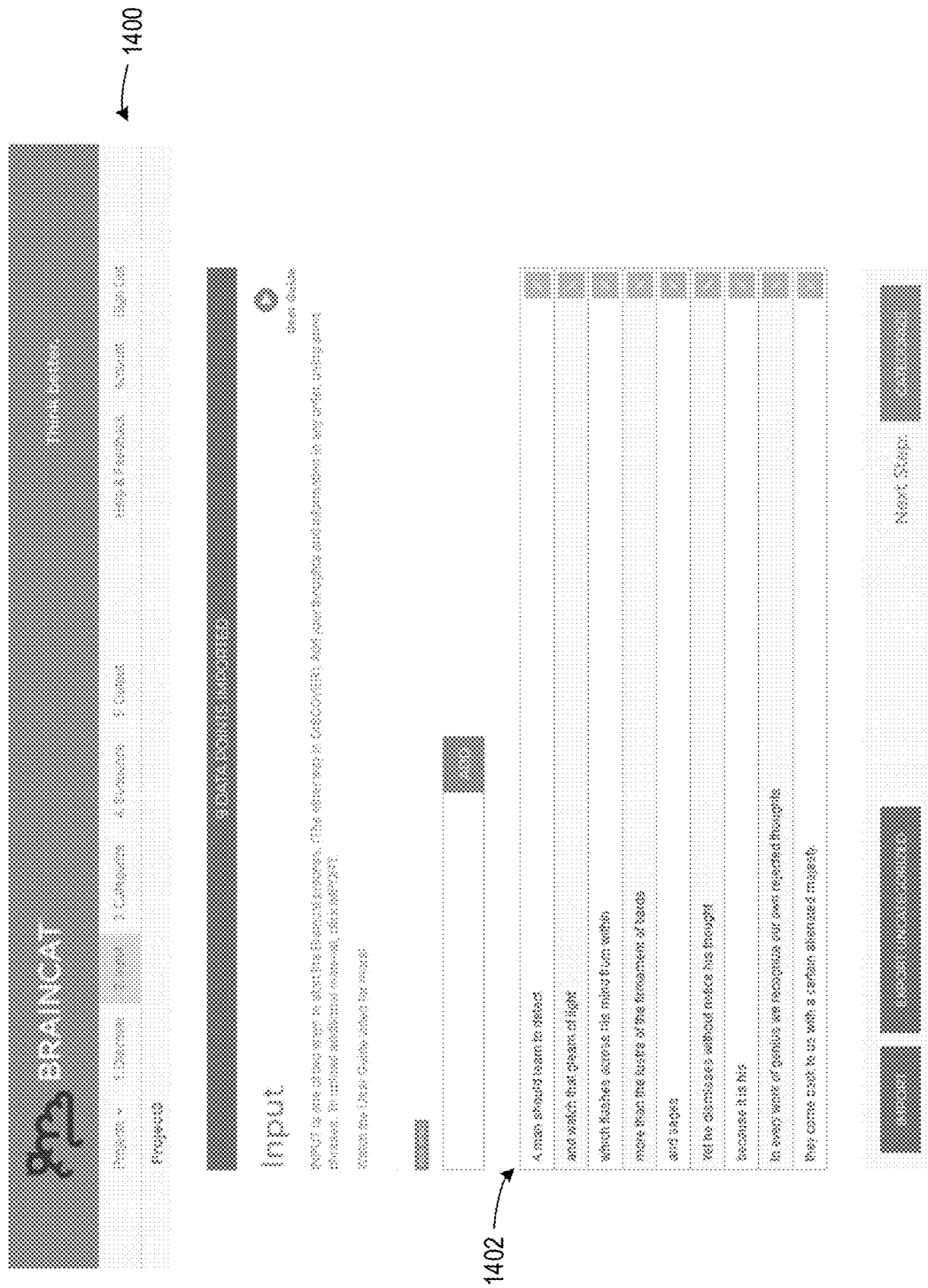
Figure 15:
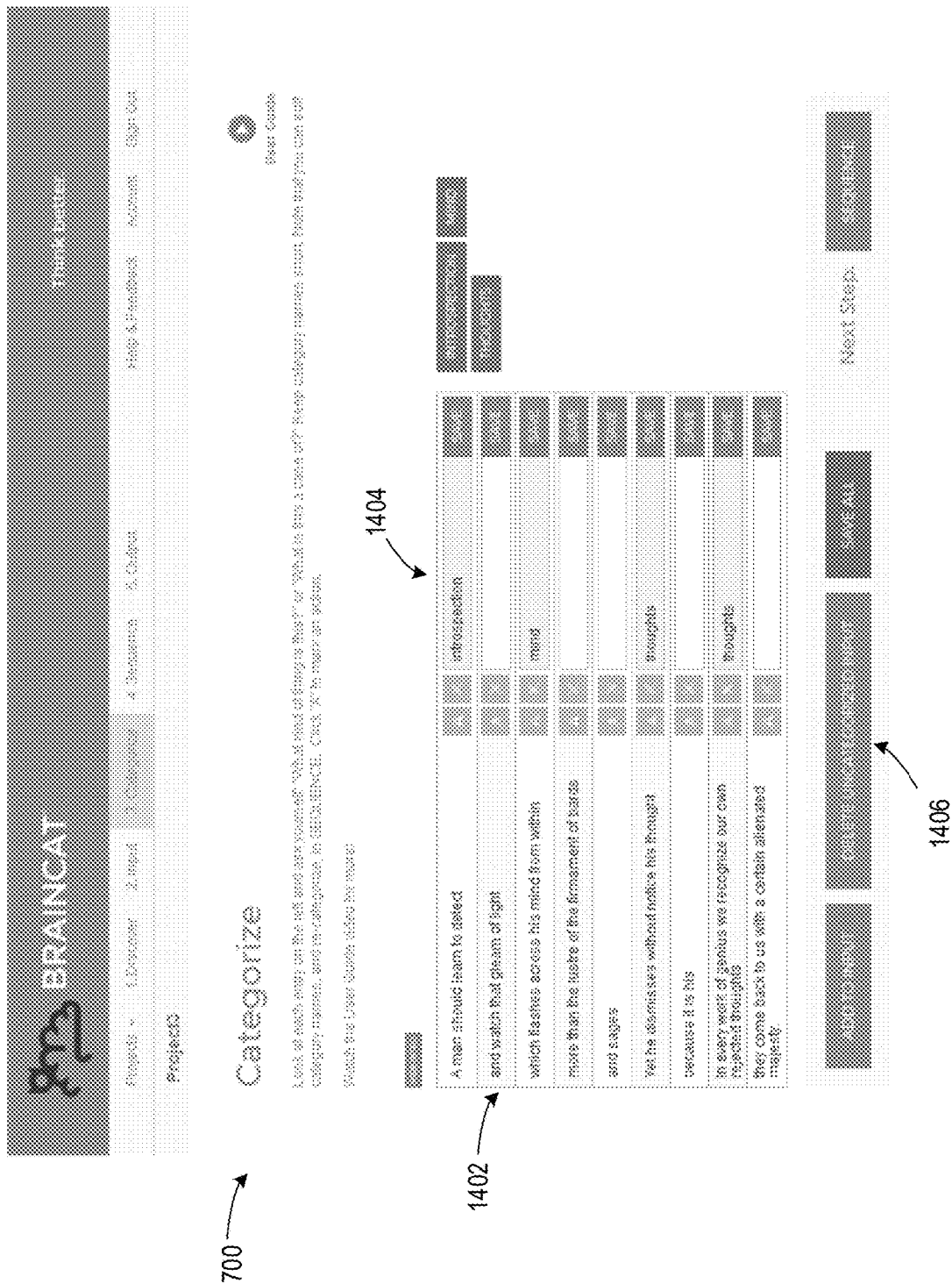

FIGS. 13-15 collectively illustrate the use of the Text-Breaker functionality in accordance with one embodiment. That is, referring to FIG. 13, the user is prompted, via a user interface 1300, to cut-and-paste a block of text into an input field 1302. As shown in screen 1400 of FIG. 14, that text is then split (using semantic, grammatical, or other cues) into a set of individual phrases and words 1402 to be used as input. As shown previously, and as illustrated in FIG. 15, the user is provided a user interface 700 that allows the user to assign categories 1404 to all or a portion of the input phrases 1402. The user may then delete uncategorized input 1406. It will be appreciated that the TextBreaker method as illustrated in these figures provides a streamlined way for the user to provide and categorize input. The input may be entered, for example, via cut-and-pasting of text, the use of a scratchpad, or importing a word-processing document.

Figure 16:
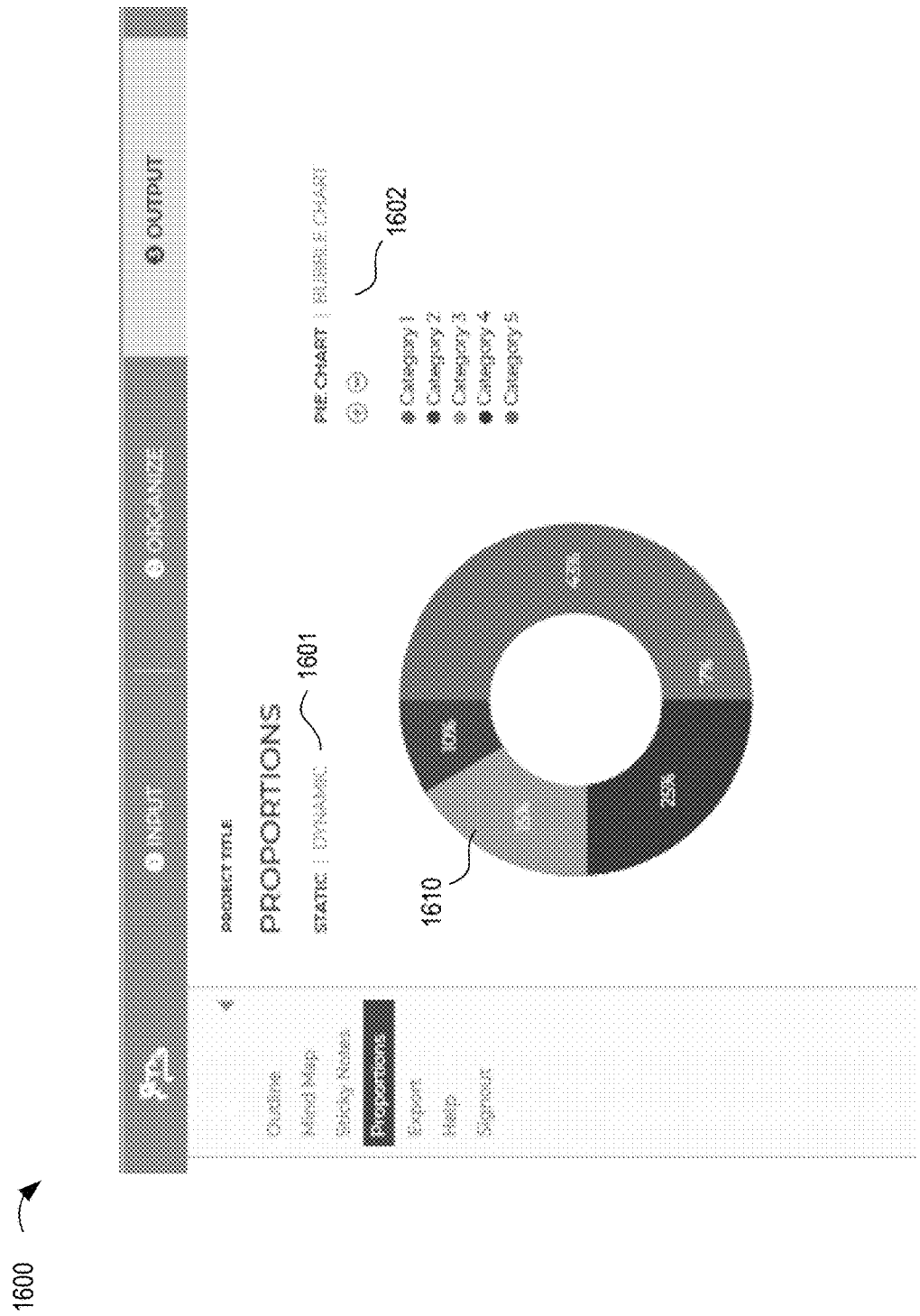
FIG. 16 illustrates an example Proportions view associated with various categories of input.

FIG. 16 illustrates an example Proportions view 1600 (another form of output) that is a particularly advantageous way for users to visualize categories of input. This option may be provided as an option in the user interface 900 shown in FIG. 9. The Proportions view is intended to address the fact that the proportion of mental attention we give things rarely reflects their objective importance to us. Our distribution of attention is largely governed by a variety of biases (for example, recency bias) or emotions (for example, fear). The categories previously described emerge from the data input by the user and are therefore relatively authentic expressions of the user's thinking. As one of its features, the present system indicates the number of data points assigned to each category.

As can be seen in FIG. 16, the user is presented with a graphical representation 1610 of this distribution of attention. The user may then be presented with a tool (e.g., 1601) to adjust these proportions to a new ideal (e.g., via a set of slider bars, via movement of the bars via a mouse, etc.). In various embodiments, additional tools are provided to allow the user to manipulate the target distribution of attention, for example by "locking" some categories at a certain percentage while varying others around the locked categories. This allows a user to visualize where the user is currently apportioning attention, so that he or she can make new decisions about where to focus. Additional controls (e.g., 1602) may be provided to change the chart type to, for example, a bubble chart or other appropriate image.

Figure 17B:
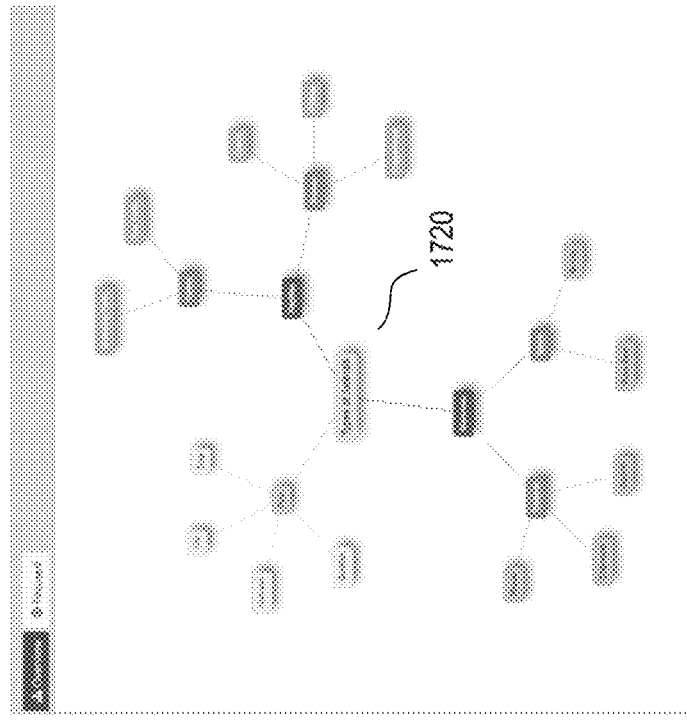
FIGS. 17A-17B illustrate various tree views or "maps" associated with categories of text strings.
Figure 17A:
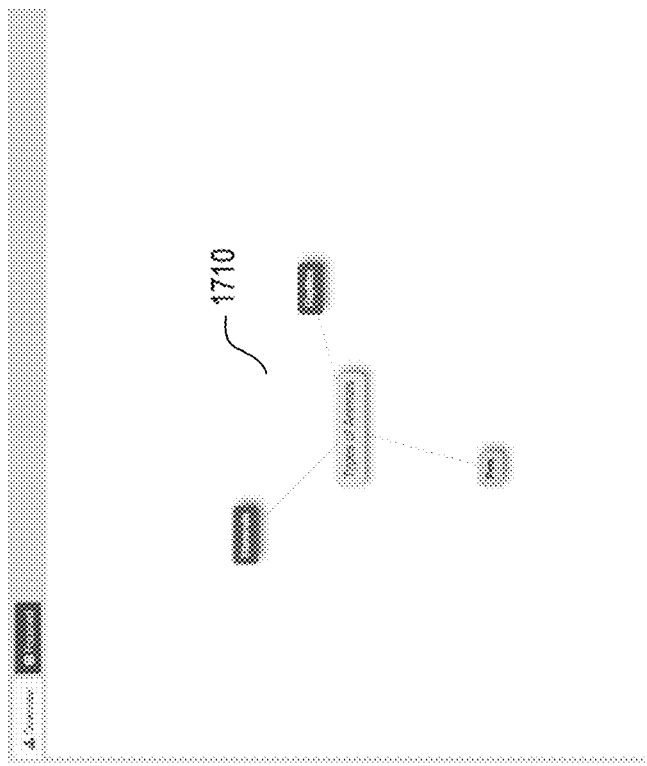

FIGS. 17A-17B illustrate various tree views or "maps" associated with categories of text strings as a refinement of the mind map shown in FIG. 12. That is, in some embodiments, the user can select between an "overview" mode 1701 (FIG. 17A) in which only high level categories 1710 are displayed, and a "focused" mode 1702 (FIG. 17B) in which the hierarchy of categories 1720 are displayed as a directed acyclic graph (i.e., a tree structure).

Braincat Social

Figures 18A, 18B:
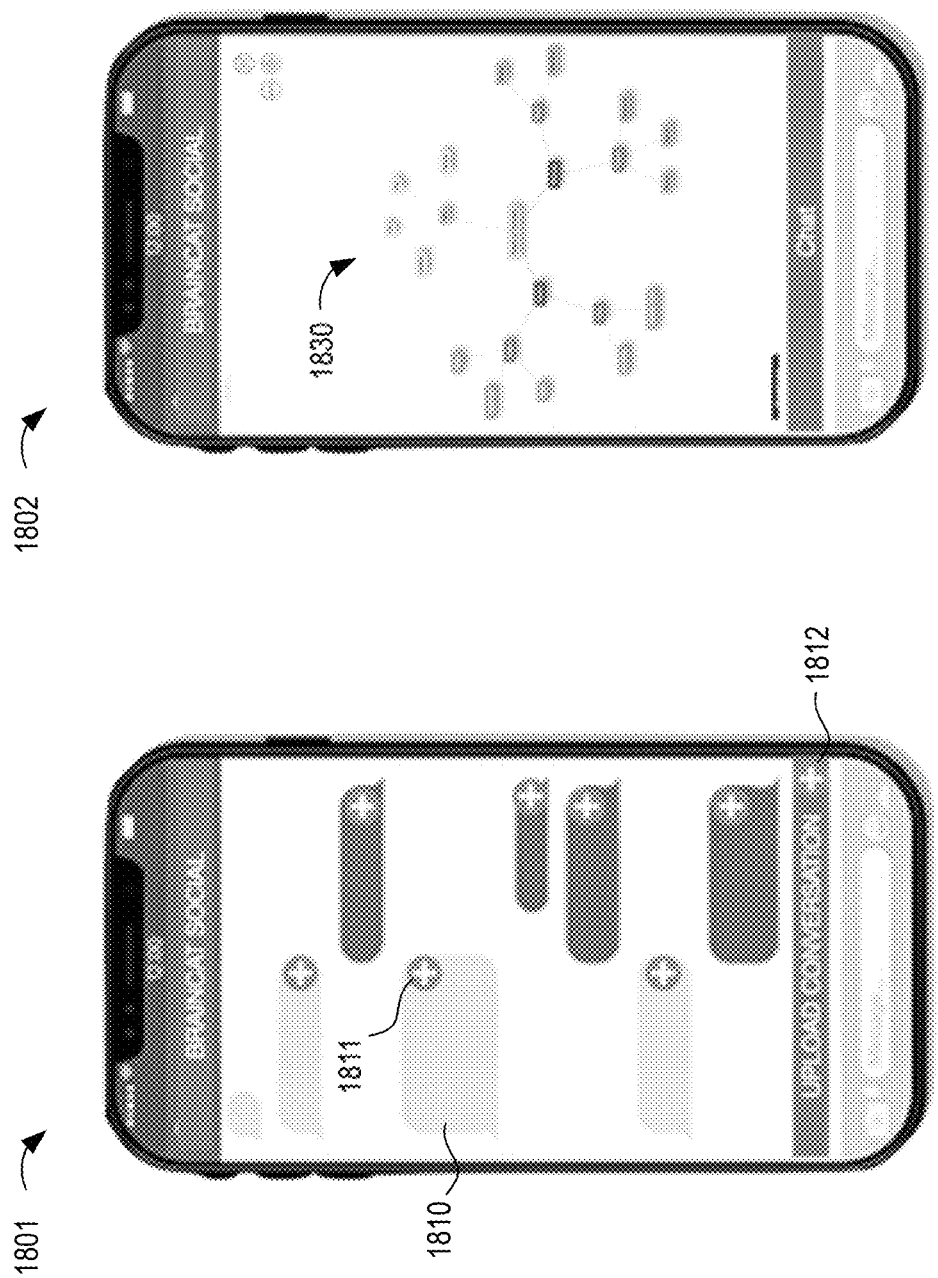
FIGS. 18A-18B are mobile device screen shots illustrating use of the present invention in connection with a chat thread in accordance with various embodiments.

In accordance with some embodiments, the present system may be used in a "social" mode, in which subscribers are allowed to engage with others in a shared thinking project. This may be implemented as a separate social application (e.g., a mobile app) that allows text conversation between an unlimited number of participants. In some embodiments, this application does not require an account with the main system: it can be used simply by downloading the application. FIGS. 18A-18B, for example, are mobile device screen shots (1801, 1802) illustrating use of the present invention in connection with a chat thread.

In general, a Braincat subscriber opens a project, and thereafter acts as host of the conversation. Every message (e.g., message 1810, in FIG. 18A) includes a suitable icon (e.g., the "+" icons 1811). When this icon is clicked by the subscriber, the contents of that message are added as input to the Braincat project. In some embodiments, the host of the project can define particular access rights (e.g., upload privileges) for other users. Alternatively, the subscriber may upload the entire conversation (e.g., via the "+" icon 1812 shown at the bottom of the screen).

Once the host has categorized and sequenced the input as described in detail above, the mind map 1830 (similar to that illustrated in FIGS. 17A and 17B) is posted to the chat thread and a notification is generated to alert participants that the mind map can be viewed. It will be appreciated that other forms of output (such as the outline or slide show) may be posted to the chat thread in addition to or in place of the mind map.

In some embodiments, users may share their user-created questions with other subscribers using, for example, a simple link. The recipient can then upload and add the shared question set to his/her Braincat "Discover" menu.

In some embodiments, Braincat subscribers may invite non-Braincat users to be members of their Braincat Team. Subscribers can then invite individual team members to participate in specific projects. Generally, not all team members are automatically included in all projects, and project participation is by invitation only. The subscriber can set permissions for each team participant in each project, determining whether the participant can use all functions or only input and output. Team participants may exchange messages while working on a project, using the Braincat Social function, adding content from those messages back into the project.

Braincat Journal

Journaling is a power tool for achieving personal development and accumulating observations over time. Its goal is to find and use insights that emerge from large volumes of writing generated over long periods. In accordance with various embodiments, the present invention enables the user to identify significant patterns that emerge in such journal entries.

Figure 19:
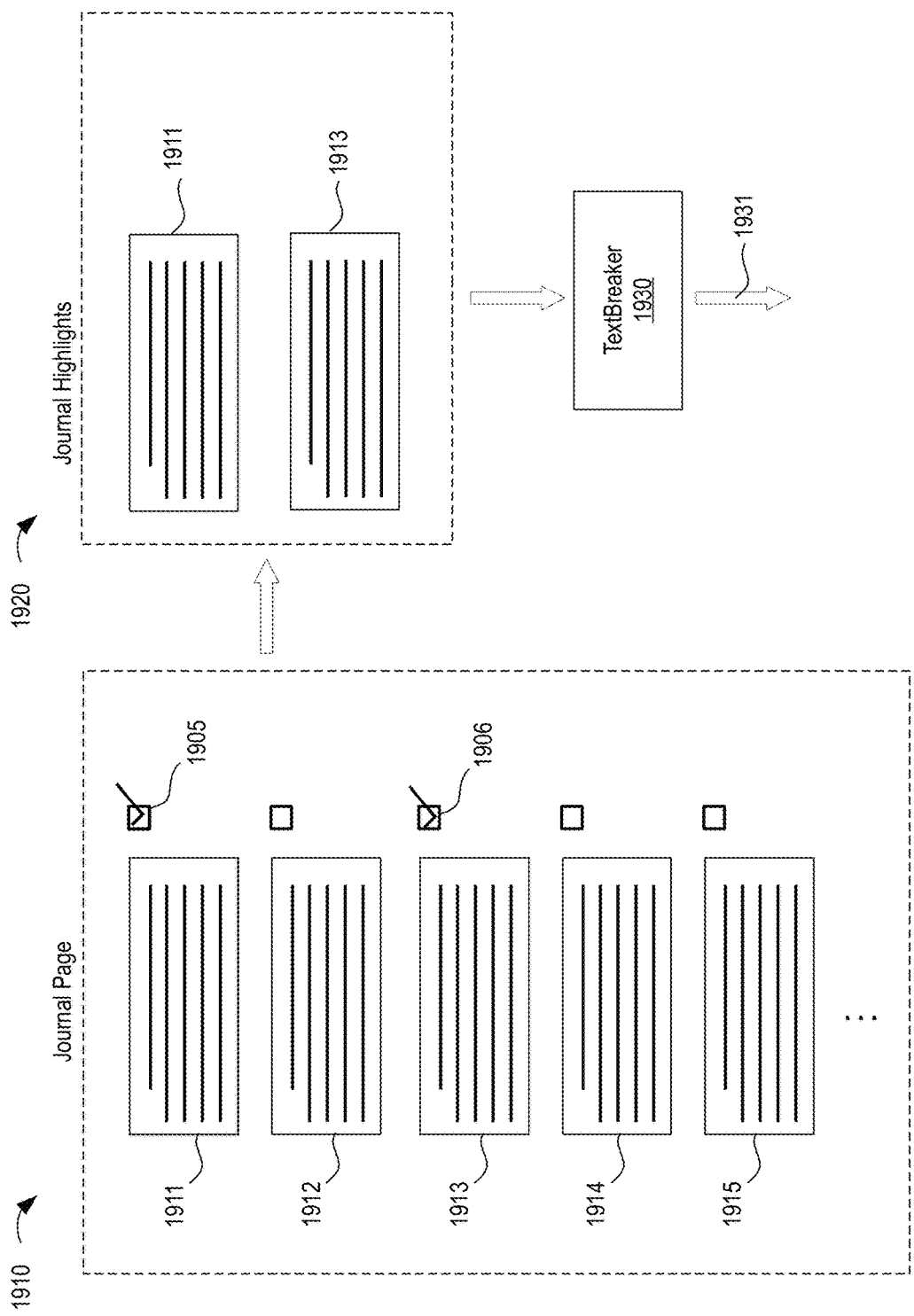
FIG. 19 illustrates journaling functionality in accordance with various embodiments.

FIG. 19, for example, illustrates journaling functionality in accordance with various embodiments of the present invention. More particularly, the user may access a "Journal Page" 1910 that provides a series of small text input blocks (e.g., 1911-1915) in which the subscriber sequentially writes short paragraphs. The user interface presents these input blocks in a way that does not disrupt the spontaneous flow of journal writing. There may be a word or character limit applied to each input block, and the cursor may skip to the next block automatically when the subscriber reaches the end of a given block.

A check box (or other suitable user interface component) is provided next to each input block. When the user clicks the corresponding check boxes (e.g., check blocks 1905 and 1906), those entries are then entered into the "journal highlights" 1920, as shown. This subset of entries can then be applied to the TextBreaker module 1930 (as described above) to produce an output 1931.

Figure 20:
FIG. 20 illustrates a database entity-relationship diagram in accordance with a particular embodiment.

It will be appreciated that the systems described herein may be implemented using a variety of database structures. FIG. 20, for example, illustrates just an entity-relationship diagram (ERD) 2000 in accordance with just one particular embodiment. It will be appreciated that this particular example, illustrated as a relational database, is not intended to be limiting in any way. Those skilled in the art will understand the various conventions used in FIG. 20 to illustrate cardinality, keys, and other aspects of the database. In general, in this example, individual entities are defined for users, project_folders, projects, entries, discover_skills, tag, tagged, discover_questions, and discover_categories. Each of these entities has a primary key (PK) as shown, and is related to other entities as indicated by the connecting lines. The cardinality (e.g., one-to-one, one-to-many, etc.) is indicated in the traditional way. It will be appreciated, again, that the invention is not limited to this database structure, and may be implemented using any database system now known or later developed.

In summary, what has been described is a cloud-based productivity system or tool for enabling a user or team of users to think clearly about vast amounts of unstructured and/or unsorted information.

In general, it will be appreciated that any of the various modules and processes described herein (for example, the modules illustrated in FIGS. 1 and 2 or the TextBreaker functionality described above) may utilize one or more machine learning (ML) models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and linear discriminant analysis models.

Furthermore, embodiments of the present disclosure have been described in terms of functional and/or logical block components and various processing steps (e.g., FIGS. 1, 2, 4A, and 4B). It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality. More generally, the present invention may be implemented using any convenient hardware, including various computer systems (with corresponding CPUs, memory devices, and storage components), networked devices, servers, database systems, and the like. The user interfaces described herein may be implemented using web-based technologies (e.g., HTML, CSS, JS, and the like) and/or native APIs associated with the platform(s) on which the software runs. Functionality and storage might be distributed across devices and servers or centralized, depending upon implementation.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A cloud-based, computer-implemented system including a processor, memory, and user interface configured to allow a user to:
   input a set of unstructured text strings via both a manual process and a TextBreaker module; provide a set of categories;
   categorize the set of unstructured text strings in accordance the set of categories;
   sequence the categorized text strings;
   summarize the categorized and sequenced text strings; and
   produce an output viewable by the user based on the summarized, categorized, and sequenced text strings;
   wherein the TextBreaker module is configured to take a first string of text and break it into the set of unstructured text strings using a parsing scheme that employs at least one of punctuation cues, grammatical cues, and semantic cues.

2. The system of claim 1, wherein the output is selected from the group consisting of a reverse mind-map, a proportions view, and an editable outline.

3. The system of claim 1, further including a journal page comprising a plurality of paragraphs, wherein the user is provided a user interface for selecting a subset of the paragraphs that are provided to the TextBreaker module for parsing.

4. The system of claim 1, further including a social network module that provides a user interface for selecting text strings from a communication stream for providing the unstructured text strings.

5. The system of claim 1, further including a discover module in which the user is presented with a sequence of prompts configured to elicit answers providing the unstructured text strings.

6. A web-based productivity method comprising:
providing a text input user interface component configured to receive a first set of unstructured text strings;
providing a TextBreaker module configured to take a first string of text and break it into a second set of unstructured text strings using a parsing scheme, wherein the parsing scheme uses at least one of punctuation cues, grammatical cues, and semantic cues;
providing a user interface component configured to receive a set of categories from the user;
categorizing, using a processor, the first and second sets of unstructured text strings in accordance the set of categories;
sequencing, using the processor, the categorized text strings;
summarizing, using the processor, the categorized and sequenced text strings; and
producing an output viewable by the user based on the summarized, categorized, and sequenced text strings.

7. The method of claim 6, wherein the output is selected from the group consisting of a reverse mind-map, a proportions view, and an editable outline.

8. The method of claim 6, further including a providing a journal page comprising a plurality of paragraphs, wherein the user is presented a user interface for selecting a subset of the paragraphs that are provided to the TextBreaker module for parsing.

9. The method of claim 6, further including providing a social network module that presents a user interface for selecting text strings from a communication stream for providing the unstructured text strings.

10. The method of claim 6, further including providing a discover module in which the user is presented with a sequence of prompts configured to elicit answers providing the unstructured text strings.

* * * * *